May 23, 1950 R. D. KELL 2,508,920

TELEVISION SYSTEM

Filed Dec. 12, 1945

INVENTOR.

Ray D. Kell

BY H. S. Grover.

ATTORNEY

Patented May 23, 1950

2,508,920

UNITED STATES PATENT OFFICE 2,508,920

TELEVISION SYSTEM

Ray D. Kell, Princeton, N. J., assignor to Radio Corporation of America, a corporation of Delaware Application December 12, 1945, Serial No. 634,554

7 Claims. (Cl. 178—5.2)

This invention relates to an improvement in television systems whereby it is possible to transmit and receive images in perspective or in apparent third dimension (that is, the so-called stereoscopic type of image), in either black and white or in conjunction with a sequential additive type color image producing system.

In the present standard television transmission of black and white images, optical images of the subject matter to be transmitted are focused upon a light responsive electrode in a television pickup or camera tube and are directed along a single optical path. Naturally, a plurality of cameras are actually used in a studio and all may be simultaneously producing television image signals, yet the signals that are actually transmitted are generally derived from one only of the plurality of camera tubes. When the optical images are focused upon the camera tube they produce electrostatic charge images which, in turn, are converted to video signals within the camera tube and these signals are transmitted to a remotely located receiver where they are employed and used to produce an optical light image on the screen of a television receiving tube. In present black and white television transmission, the horizontal deflection frequency or line frequency is of the order of 15,750 cycles per second whereas the field or vertical deflection frequency is of the order of 60 cycles per second. Since double interlacing is usually employed, two fields are required for each complete picture or image frame. The frame frequency presently standardized is 30 per second. Each complete picture or image or frame is, therefore, composed of approximately 525 picture lines whereas each television field includes half this number or 262½ lines.

In accordance with the present invention, it is proposed to direct light to the light responsive electrode of a camera tube along two different optical paths and to provide an arrangement whereby the optical images which are directed upon the camera tube are produced as a result of the transmission of light along these two paths alternately. The image signals which are produced by the camera tube will then be alternately representative of two displaced images of the object area televised, the degree of displacement being such as will produce substantially normal stereoscopic or third dimension effects. These video signals are then amplified and transmitted to a remotely located receiver where they are utilized for the production of optical light images on a single fluorescent or image surface. In order that the desired stereoscopic effect may be obtained, it is necessary that the individual eyes of the observer see only the proper images and accordingly, provisions are made at the receiver whereby each eye of the observer sees images which correspond to the light transmitted along a certain one only of the two optical light paths at the transmitter. For causing the camera tube to respond to images directed along the two paths in succession and for causing the eyes of the observer to see only their proper images, light polarizing screens are employed.

The present invention may also be used in conjunction with color television by including, at the transmitter, a color filter assembly for separating the component colors in order that signals representative of the component colors may be transmitted sequentially. A corresponding light filter assembly is also employed at the receiver for imparting the proper color tone to the produced black and white optical image. Naturally, the color filter assembly at the receiver must be operated in synchronism with the corresponding assembly at the transmitter and the phase relationship of the filter assemblies must be properly adjusted.

It is, therefore, one purpose of the present invention to provide a system whereby it is possible to transmit television images to produce a perspective or stereoscopic effect.

Another purpose of the present invention resides in the provision of a system for transmitting color television images, and, in addition, imparting to these images a perspective or third dimension effect.

Still another purpose of the present invention resides in the provision of a system for transmitting images in perspective and for additionally causing the images to appear in substantially their original or natural color.

Various other purposes and advantages will become more apparent to those skilled in the art from the following detailed description particularly when considered in connection with the drawings wherein.

Figures 1, 2:
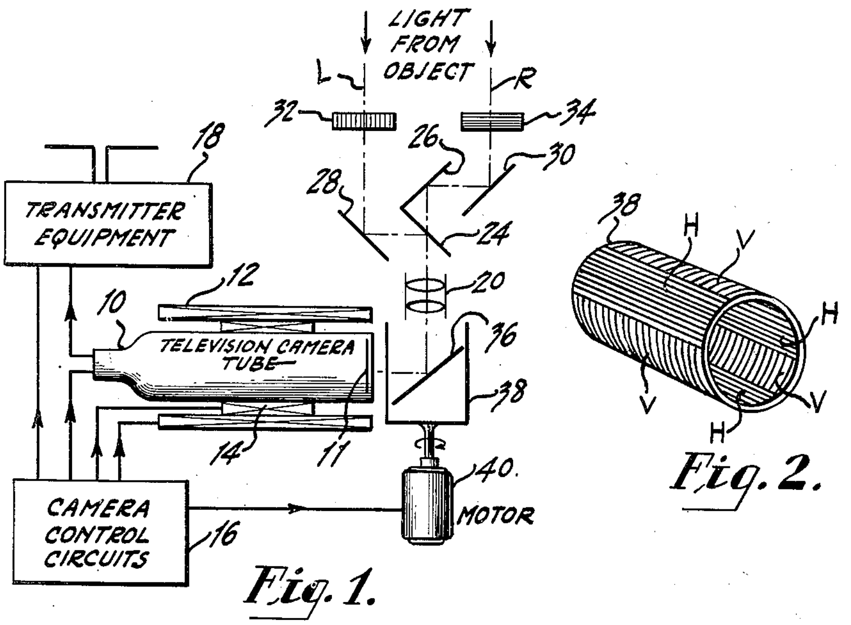
Figure 1 represents schematically a preferred form of a television transmitter incorporating the present invention.
Figure 2 shows a polarizing drum for causing light transmitted along two separate paths to be alternately projected upon a light responsive target surface in a television camera tube.

Referring now to the drawings and more particularly to Figure 1 thereof, there is shown a television transmitter including a television pick-up or camera tube 10 preferably of the Orthicon type. The details of this camera tube are not shown but it includes, among other things, a light responsive electrode surface 11 upon which an optical image is projected together with an electron gun structure for producing a narrow focused beam of electrons for scanning a mosaic surface upon which is produced an electrostatic charge image as a result of the projection of a light image upon the light responsive electrode. Proper focal condition of the cathode ray beam is maintained by means of a focusing coil 12, which surrounds the camera tube and which extends throughout a major portion of its length. For deflecting the produced cathode ray beam in substantially mutually perpendicular directions, a deflecting coil 14 is provided. The television camera tube 10, the focusing coil 12 and the deflecting coils 14 are supplied with energy from various camera control circuits of known variety, all of which are represented schematically at 16. The image signals produced by the television camera tube are directed to the television transmitter equipment 18 which increases the intensity of the image signals and which mixes with the image signals the necessary synchronizing signals, blanking signals, and so forth, that are necessary for successful transmission and reception of the television images. These signals are then transmitted, preferably by means of a radio frequency carrier, in order that they may be received by a remotely located television receiver.

Associated with the television camera tube is an optical system including lenses 20 for focusing images of the subject matter to be transmitted upon the light responsive electrode surface 11. Positioned immediately in front of the lenses 20 is a half silvered mirror 24 and in front of this mirror is a reflecting surface 26. Additional reflecting surfaces 28 and 30 are also provided. A pair of stationary polarizing screens 32 and 34 are also employed and the planes of polarization of these two screens are arranged at right angles or normal to each other. In explaining the operation of the present invention, it will be assumed that the polarizing screen 32 is so oriented as to transmit only vertically polarized light while the polarizing screen 34 transmits only horizontally polarized light.

From Figure 1, it may, therefore, be observed that vertically polarized light transmitted along path L is reflected by the reflecting surface 28 onto the half silvered or semi-reflecting surface 24, where it is again reflected into the lens system 20. Similarly, horizontally polarized light transmitted along path R is reflected by the reflecting surface 30 onto the reflecting surface 26 where it is directed through a semi-transparent or half silvered surface 24 into the lens system 20.

Situated between the lens system 20 and the television camera tube is a stationary reflecting surface 36 and a rotating drum 38. The drum 38 is shown somewhat in detail in Figure 2 and includes a plurality of polarizing filters. Each successive polarizing screen has its plane of polarization normal to each adjacent polarizing screen. The peripheral extent of each polarizing screen is substantially identical to the degree of vertical deflection of the cathode ray beam and the speed of rotation of the drum is preferably such that the rate that the line of demarcation between polarizing screens traverses the light responsive electrode 11 corresponds substantially identical to the vertical or field deflection rate of the scanning cathode ray beam. The drum 38 is rotated by means of motor 40 and its speed as well as its phase relationship is maintained by equipment operating in conjunction with the camera control circuits 16.

As the drum is rotated, it will be observed, therefore, that although both horizontal and vertical polarized images are present at the reflected surface 36, these images are separated by the polarizing drum so that the light responsive surface 11 is exposed to an image transmitted along the one or the other of the two light paths L or R individually and successively. If, for example, a vertical polarized portion of the polarizing drum is immediately opposite the light responsive electrode surface 11, then only an image transmitted along the optical light path L through stationary polarizing screen 32 will be projected upon the light responsive electrode surface. The horizontally polarized image transmitted along optical light path R will not pass through the vertically polarized portion of the drum. Accordingly, as the drum is rotated, images are sequentially projected upon the light responsive surface corresponding to successive views of the object area along the two separate light paths L and R.

It is preferable that the scanning operation take place in the immediate vicinity of, or directly under, the line of demarcation between the adjacent polarizing portions or sections of the polarizing drum. Such a technique is shown and described, for example in U. S. Patent No. 2,458,649, issued to Otto H. Schade on January 11, 1949. When such a technique is employed, television image signals will be produced corresponding to the image last projected upon the light responsive electrode and that image will have arrived at the television camera tube along the one or the other of the two paths.

In order that exact focal conditions of the optical light image may be maintained, even at short operating distances, it is preferable that the two light paths be identical in length, and with the arrangement above described and shown in Figure 1, the optical distance from an object to be televised to the lens system 20 and the light responsive surface 11 is the same for each light path.

Figure 5:
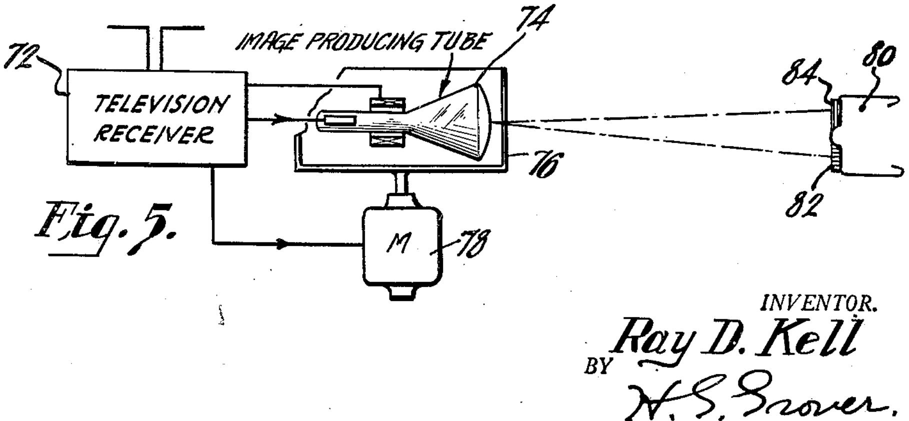
Figure 5 represents schematically a television receiver for receiving stereoscopic images in either black and white or in color.

With the system as above described, it is obvious that television image signals will be produced in which alternate fields will be representative of the object area as it appears along one light path, whereas the remaining fields will be representative of the object as it appears along the other light path. This situation is true, if it is assumed that the peripheral extent of each individual polarizing element corresponds substantially to the degree of vertical deflection of the cathode ray beam in the television camera tube. When these signals are transmitted to a receiver, which is represented schematically in Figure 5, the signals are received, amplified and demodulated by appropriate circuits contained within the receiver 72. The demodulated signals are applied to the control electrode of a television image producing tube 74 in order to current modulate a cathode ray beam generated therein, so that black and white images are produced on the viewing screen of the tube. Associated with the image producing tube is a drum 76 which is rotated, by means of a motor 78, at a desired speed corresponding to the speed of the rotation of the filter drum at the transmitter and a desired phase condition is also maintained. The drum includes alternate peripheral segments of vertically and horizontally polarized screens in order that successive field images will be polarized alternately in a vertical or horizontal direction. In order that an observer may segregate the images so that the right eye sees images transmitted along the optical light path R in Figure 1 and the left eye sees images transmitted along the optical light path L, the observer is provided with a pair of polarized glasses 80 including lenses 82 and 84. The lens 82 is polarized vertically to correspond to the polarizing screen 32 in Figure 1 while lens 84 is horizontally polarized to correspond to the screen 34 of Figure 1. When the drum 76 is properly phased with respect to the drum 38 at the transmitter, the left eye of the observe sees through vertically polarized lens 82 (and a correspondingly polarized segment of the drum 76) images corresponding to those transmitted only along the optical line path L of Figure 1. Similarly, the right eye of the observer sees images transmitted along optical light path R at the transmitter. Since successive fields at the television receiver represent images transmitted alternately along the two light paths and since the field repetition rate is approximately 60 per second, each eye of the observer sees 30 images per second representing a view of the televised subject matter taken along a particular light path. With such an arrangement stereoscopic or third dimension television pictures are produced.

The above described method of transmitting black and white stereoscopic television images might be objectionable where double interlacing is employed since the observer would always see, with a particular eye, images composed of the same lines on the screen of the receiver. In order to remove this objection, it is only necessary to make the peripheral extent of the separate polarizing elements of the filter drum correspond to approximately twice the extent of the vertical deflection of the cathode ray beam in the television camera tube. When the filter drum 38 is so modified, the line of demarcation of the polarizing segments still traverses the light responsive electrode at the proper rate, but the shift as between optical line paths L and R occurs at the rate of 30 times per second rather than 60. A complete frame (constituting two successive fields) would, therefore, correspond to a view along one light path, with the next frame corresponding to a view along the other light path. With such an arrangement the observer would, therefore, see with each eye a complete frame or picture including both interlaced lines and these complete frames would be observed alternately through the lenses 82 and 84. Under these conditions, the filter drum 76 at the receiver must also be modified so that each polarizing segment will be in front of the image tube for a period corresponding to two fields or one frame.

The above described method of presenting television images in perspective or third dimension can also be used in conjunction with sequential color television but under these circumstances a color filter assembly for separating the component colors must be used at both the transmitter and the receiver.

In the transmission of color television, it is generally conventional to translate the image into video signals representing sequentially three different component colors, namely blue, green and red. In a sequential color system, video signals are transmitted sequentially representing the color content of the subject matter with each successive field representing a different component color. In order to remove or materially reduce any possible flicker, it is generally proposed that 120 fields or vertical deffections per second will be employed. It is also proposed that a double interlaced method of scanning be used. Under these circumstances, 120 fields are transmitted per second and three successive fields, representing all three component colors are repeated at the rate of 40 times per second. Due to the interlaced transmission and the proposed number of three component colors, the repetition rate for the transmission of a complete color picture or image is 20 per second. In other words, 20 complete color images occur during each second, each complete color image including six separate color fields.

Figure 3:
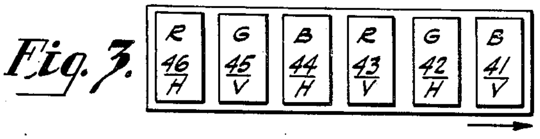
Figures 3 and 4 show the construction of different light filters and polarizing screens to be used in connection with stereoscopic color television transmission.

When color television images are to be presented in perspective or third dimension, a color filter disc or drum will be employed at the transmitter, incorporating the necessary blue, green and red color filters and including also horizontal and vertically polarized screens. A development of such a drum is shown in Figure 3 and the direction of the relative motion of the drum with respect to the television camera tube is represented by the arrow associated therewith. The filter assembly shown in Figure 3 includes six color filters 41 through 46. Filters 41, 42 and 43 are colored blue, green and red, respectively, as also are the filters 44, 45, and 46. Associated with these filters are polarizing screens and these screens may be superimposed upon the filters. Each alternate screen is polarized at 90° with respect to the remaining screens, and, as shown in Figure 3, filters 41, 43 and 45 have associated therewith vertically polarized screens while filters 42, 44 and 46 have associated therewith horizontally polarized screens. It will be observed that successive color filters of the same color are polarized differently so that each eye of the observer sees each individual color sequentially and each individual color is presented to each eye alternately.

In the receiver, a color and polarizing drum or similar structure is employed which includes segments having a series of color filters and polarizing screens similar to that shown in Figure 3. The drum at the receiver, when rotated in synchronism with the filter and polarizing assembly at the transmitter and when properly phased therewith, will permit an observer, when equipped with the glasses 80 including polarizing lenses 82 and 84, to see color television images in perspective or third dimension.

When a television transmitter and receiver are equipped with light filters and polarizing sections such as shown in the development of Figure 3, it is apparent, therefore, that color television images may be transmitted and may be presented to the observer in perspective or third dimension.

Figure 4:
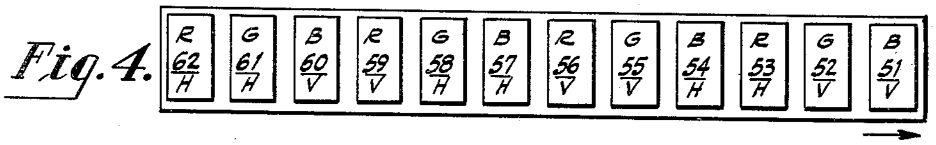

The above described third dimension color television system is subject to a criticism, however, which, in fact, is not entirely objectionable, but which occurs by reason of the fact that alternate segments of the filter assembly are polarized in opposite directions. In a double interlaced transmission system (as described above in connection with Figure 2) each eye of the observer then sees only a single group of line elements of each frame. In order to overcome this objection, it is only necessary to employ a filter and polarizing assembly at both the transmitter and the receiver which has a construction similar to that shown in the development in Figure 4. In this figure, the filter and polarizing assembly includes twelve elements including four each of the three blue, green and red light filter segments. Half of the twelve elements are horizontally polarized and the other half are vertically polarized, but it will be observed that two successive elements are polarized in the same direction whereas the next two successive elements are polarized in the opposite directions. The filter assembly may include, for example, elements 51 through 62, of which the elements 51, 54, 57 and 60 are blue, the elements 52, 55, 58 and 61 are green, while the elements 53, 56, 59 and 62 are red. The direction that the polarizing screens are polarized are shown in Figure 4 with elements 51, 52, 55, 56, 59 and 60 polarized in a vertical direction and elements 53, 54, 57, 58, 61 and 62 polarized in a horizontal direction.

When such a filter is employed at both the transmitter and the receiver, color television images will be presented in a manner well known to those skilled in the art and these images will appear in perspective due to the use of the polarizing screens employed at the transmitter and receiver. Since signals are transmitted representing two successive television fields viewed along one optical path, followed by two successive fields viewed along the other optical path, each eye of the observer will see a complete frame including two transmitted fields. Under these circumstances and assuming 120 fields per second, the repetition rate of a complete cycle of transmission is 10 per second, yet all three component colors of the image are presented at a rate of 40 cycles per second. Due to the double interlaced method of transmission, one complete color cycle occurs during each $1/20$ of a second. Because of the pairing of the polarizing screens, a complete color and stereoscopic cycle occurs during $1/10$ of a second. In spite of this apparent low repetition rate, for a complete color and stereoscopic cycle, very little flicker is apparent by reason of the fact that the field repetition rate is 120 cycles per second.

Although the present invention is described assuming horizontally and vertically polarized gradings, any other directions may as well be employed so long as the relative polarized directions of the screens are normal to each other. Furthermore, in the optical system shown in Figure 1, provision is made whereby the lengths of the optical light paths are identical. If the transmitter is to be used for relatively long range work, and with low speed lenses, this degree of refinement is not necessary and under these circumstances, it is possible to eliminate reflecting surfaces 28 and 30. When these reflecting surfaces are omitted, the half silvered surface 24 would be rotated counter-clockwise through 90° and the object, rather than appearing at the side of the television camera tube (as in Figure 1), would naturally appear at the end of the television tube (to the right in the drawing).

While a television camera tube of the Orthicon type is specifically mentioned herein, it is to be understood that any other type of camera tube could as well be used. Due to the inherent light losses of the system, however, the camera tube should have considerable light sensitivity. For example, television camera tubes such as shown and described in Iams et al. Patent No. 2,213,175 or in Iams Patent Nos. 2,213,177 and 2,288,402 may be used.

The use of a drum type polarizing assembly is preferable to a disc type since the former insures that the plane of polarization will not be shifted during operation. If a disc is used at either or both the transmitter and receiver, the disc should be so constructed and of sufficient size that a minimum amount of orientation of the plane of polarization occurs as the disc is rotated. A disc suitable for this purpose is shown and described in Somers U. S. Patent 2,429,849, issued on October 28, 1947. Polarizing and filter assemblies of the endless belt type may also be used.

Having now described the invention, I claim:

1. A transmitter for transmitting television signals in perspective through the cooperative use of a television camera tube having a light responsive image receiving surface, the combination comprising a lens system for projecting an optical image on said surface, a rotatable light polarizing assembly positioned between the lens system and the camera tube, said assembly including a plurality of light polarizing sections, the plane of polarization of each section being substantially normal to the plane of polarization of each adjacent section, a pair of horizontally spaced polarizing screens positioned between the lens system and an object area to be televised, the planes of polarization of the pair of screens being normal to each other and corresponding individually to the planes of polarization of the alternate sections of the polarizing assembly, optical means positioned between the pair of polarizing screens and the lens system for directing light transmitted by the spaced screens from an object area into the lens system along two light paths, and means to move the polarizing assembly so that the alternately polarized sections thereof are sequentially and progressively interposed in the optical path between the lens system and the camera tube to subject the light responsive surface to optical images of the object area transmitted alternately along the two light paths.

2. A television transmitter for transmitting television signals in apparent third dimension through the cooperative use of a television camera tube having a light responsive image receiving surface, comprising a lens system for projecting and focusing an optical image on said surface, a rotatable light polarizing drum positioned between the lens system and the camera tube, said drum including a plurality of light polarizing sections in which the peripheral extent of each section corresponds to the vertical dimension of the utilized portion of the light responsive surface and in which successive sections of the polarizing drum are polarized in planes substantially normal to each other, a pair of horizontally spaced polarizing screens positioned between the lens system and an object area to be televised, the planes of polarization of the pair of screens corresponding individually to the planes of polarization of the alternate sections of the polarizing drum, optical means positioned between the lens system and the pair of polarizing screens for directing the polarized light transmitted by the spaced screens from a common object area into the lens system along substantially parallel and equal length light paths, means to rotate the polarizing drum so that the successively, differently polarized sections thereof are sequentially and progressively interposed in the optical path between the lens system and the camera tube thereby to subject the light responsive surface to optical images of the object area transmitted alternately along the two light paths to produce corresponding electrostatic charge images, and means to convert the charge images into a series of television video signals.

3. A transmitter for transmitting television signals in perspective including the use of a television camera tube having a light responsive image receiving surface, comprising in combination a lens system for projecting an optical image onto said surface, a rotatable light polarizing drum positioned between the lens system and the camera tube, said drum including a plurality of polarizing sections in which successive sections are polarized in directions substantially normal to each other and in which the peripheral extent of each section corresponds substantially to twice the effective vertical dimension of the utilized portion of the light responsive surface, a pair of stationary horizontally spaced polarizing screens positioned between the lens system and the object area to be televised, the planes of polarization of the pair of screens being substantially normal to each other and corresponding to the planes of polarization of the successive sections of the polarizing drum, optical means positioned between the lens system and the pair of polarizing screens for directing light transmitted by the spaced screens from the object area into the common lens system, means to rotate the polarizing drum so that the alternately polarized sections thereof are sequentially introduced into the optical light path between the lens system and the camera tube to alternately subject the light responsive surface of the camera tube to optical light images transmitted along the one or the other of the two light paths alternately, and means to convert the optical images into a series of television signals in synchronism with the rotation of the polarizing drum.

4. A transmitter for transmitting color television signals in perspective including the use of a television camera tube having a light responsive image receiving surface, comprising a lens system for projecting an optical image onto said surface, a rotatable light polarizing and light filter assembly positioned between the lens system and the camera tube, said assembly including a plurality of alternately polarized sections in which the planes of polarization of adjacent sections are substantially normal to each other, and in which successive sections of the assembly contain differently colored filters in accordance with the component colors into which the object area is to be segregated, a pair of horizontally spaced polarizing screens positioned between the lens system and the object area to be televised, the planes of polarization of the pair of screens being normal to each other and corresponding individually to the planes of polarization of the alternate sections of the polarizing and filter assembly, optical means positioned between the pair of polarizing screens and the lens system for directing light transmitted by the spaced screens from the object area into the lens system along two light paths, means to move the polarizing and filter assembly so that successive images projected on the light responsive surface of the television camera tube represent sequentially the color content of the different component colors of the object area and so that the successive images are directed on the light responsive surface along the two light paths alternately, and means to convert the optical images into a series of video signals.

5. A transmitter for transmitting color television signals in apparent third dimension through the cooperative use of a television camera tube having a light responsive image receiving surface, comprising a lens system for projecting an optical image on said surface, a rotatable polarizing and filter drum positioned between the lens system and the camera tube, said drum including a plurality of sections each of which is provided with a successively differently colored light filter and in which successive sections are polarized in planes substantially normal to each other, a pair of horizontally spaced polarizing screens positioned between the lens system and the object to be televised, the planes of polarization of the pair of screens being normal to each other and corresponding to the planes of polarization of the successive sections of the polarizing and filter drum, optical means positioned between the polarizing screens and the common lens system for combining the light transmitted along each path and for directing the light into the lens system, means to rotate the drum so that the light responsive surface of the camera tube has projected thereon differently colored light images representing the different component colors of the object area and so that each successive image corresponds alternately to light transmitted along the two light paths, means to convert the light images into a series of television video signals in synchronism with the rotation of the polarizing and filter drum, and means to transmit the series of video signals to a remotely located receiver.

6. A transmitter for transmitting color television signals in apparent third dimension wherein is used a television camera tube having a light responsive image receiving surface, comprising a lens system for projecting an optical image on said surface, a rotatable polarizing and filter drum positioned between the lens system and the camera tube, said drum including a plurality of sections each of which is provided with a successively differently colored light filter and in which successive pairs of sections are polarized in planes substantially normal to each other, a pair of horizontally spaced polarizing screens positioned between the lens system and the object to be televised, the planes of polarization of the pair of screens being normal to each other and corresponding to the planes of polarization of the successive pairs of sections of the polarizing and filter drum, optical means positioned between the polarizing screens and the lens system for combining the light transmitted along each path and for directing the light into the lens system, means to rotate the drum so that the light responsive surface of the camera tube has projected thereon differently colored light images representing the different component colors of the object area and so that each successive pair of images results from light transmitted along a different one of the two light paths, means to convert the light images into a series of television video signals in synchronism with the rotation of the polarizing and filter drum, and means to transmit the series of video signals to a remotely located receiver.

7. A television receiver for receiving color television video signals representing different component colors of an object area and representing a perspective of an object area in which the signals correspond to images of the object area transmitted alternately along substantially parallel horizontally spaced optical light paths, comprising a receiving system, an image producing tube including the viewing screen, means including said receiving system for producing optical images at the viewing screen in response to the received video signals, a rotatable polarizing and light filter assembly positioned in front of the viewing screen, said assembly including a plurality of sections each of which is provided with a successively differently colored light filter corresponding to the component colors represented by the received video signals and in which successive adjacent pairs of the sections are provided with light polarizing screens, the planes of polarization of the successive pairs being substantially normal to each other, means to rotate the polarizing and filter assembly at a rate such that polarizing sections having the same plane of polarization are effectively in position in front of the viewing screen at intervals when signals are received corresponding to an image of the object area transmitted along a predetermined path, the color filter provided in the successive sections simultaneously imparting a desired color tone to the produced images, and a pair of viewing glasses adapted to be worn by an observer, said glasses including two polarized lenses having their planes of polarization substantially normal to each other and corresponding to the planes in which the produced images are polarized by the polarizing and filter assembly, whereby the color television images appear in perspective to the observer.

RAY D. KELL.

REFERENCES CITED

The following references are of record in the file of this patent:

UNITED STATES PATENTS

| Number | Name | Date |
|---|---|---|
| 2,301,254 | Carnahan | Nov. 10, 1942 |
| 2,319,803 | Dyer | May 25, 1943 |
| 2,349,071 | Baird | May 16, 1944 |
| 2,384,260 | Goldsmith | Sept. 4, 1945 |
| 2,429,849 | Somers | Oct. 28, 1947 |

FOREIGN PATENTS

| Number | Country | Date |
|---|---|---|
| 552,582 | Great Britain | Apr. 15, 1943 |